United States Patent [19]

Cury

[11] Patent Number: 5,099,337
[45] Date of Patent: Mar. 24, 1992

[54] METHOD AND APPARATUS FOR PRODUCING CUSTOMIZED VIDEO RECORDINGS

[76] Inventor: Brian L. Cury, 87 Maple St., Teaneck, N.J. 07766

[21] Appl. No.: 429,104

[22] Filed: Oct. 31, 1989

[51] Int. Cl.$^5$ .............................................. H04N 5/76
[52] U.S. Cl. ................................................... 358/335
[58] Field of Search ............... 358/335, 310, 342, 906; 360/33.1, 35.1, 55, 137

[56] References Cited

U.S. PATENT DOCUMENTS

| | | |
|---|---|---|
| 3,575,552 | 4/1971 | Grant et al. |
| 3,627,914 | 12/1971 | Davies |
| 4,011,404 | 3/1977 | Graham |
| 4,049,907 | 9/1977 | Damon |
| 4,092,673 | 5/1978 | Adams |
| 4,258,385 | 3/1981 | Greenberg et al. |
| 4,488,179 | 12/1984 | Kruger et al. |
| 4,577,229 | 3/1986 | Cierva et al. |
| 4,580,158 | 4/1986 | Macheboeuf |
| 4,602,286 | 7/1986 | Kellar et al. |
| 4,688,105 | 8/1987 | Bloch et al. ........................ 358/335 |
| 4,789,907 | 12/1988 | Fischetti et al. ................... 360/33.1 |
| 4,841,378 | 6/1989 | Cogert ................................. 358/335 |
| 4,858,011 | 8/1989 | Jackson et al. |
| 4,965,673 | 10/1990 | Bozzo et al. ........................ 358/335 |

FOREIGN PATENT DOCUMENTS 2508712 2/1975 Fed. Rep. of Germany.

Primary Examiner—Donald McElheny, Jr.
Attorney, Agent, or Firm—Fitzpatrick, Cella, Harper & Scinto

[57] ABSTRACT

Method and apparatus for producing customized video recordings. The apparatus includes audio/video reproduction equipment for displaying prompt information and for providing a first audio signal synchronous with the prompt information. The apparatus further includes a device for providing a first video signal representative of background information, audio/video recording equipment for providing a second video signal and a second audio signal representative of a live performance performed synchronously with the display of the prompt information. A mixer is provided for combining the first and second audio and video signals, and creative modification are added whereupon the combined signals are recorded to form the customized video recording.

22 Claims, 4 Drawing Sheets

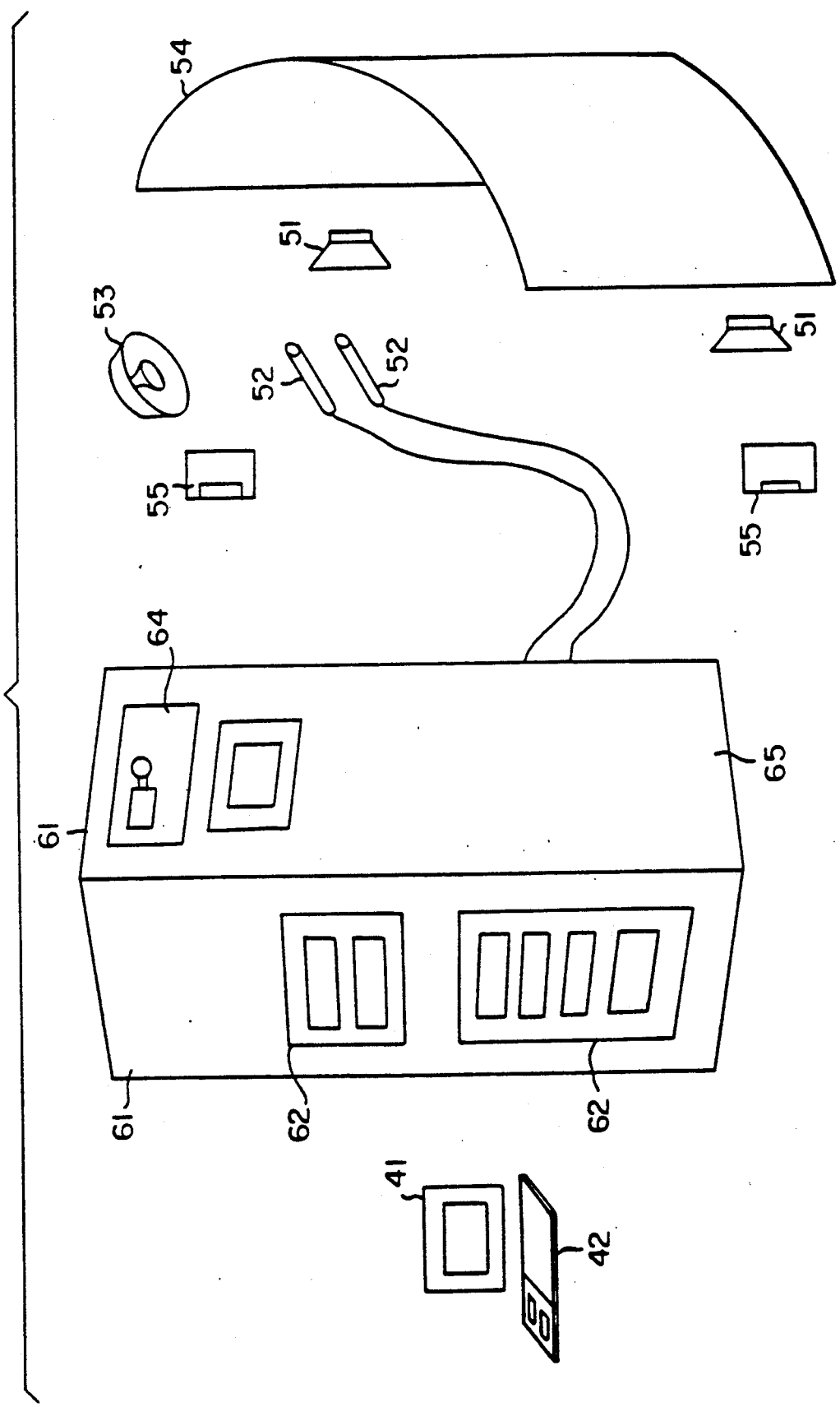

METHOD AND APPARATUS FOR PRODUCING CUSTOMIZED VIDEO RECORDINGS

BACKGROUND OF THE INVENTION

1. Field of the Invention

The present invention pertains to a method and apparatus for producing customized video recordings. The invention is especially useful in the preparation of customized music videos, although the invention is applicable in any setting where audio and video signals are combined to create customized recordings.

2. Description of the Related Art

The production of customized video recordings normally requires many machines and many separate steps. For example, with respect to music videos, two performances are normally required. In the first performance, a performer sings lyrics which are recorded on an audio track. The performed lyrics are mixed together with music and other background audio information to create an audio signal.

In the second performance, the performer lip-syncs to the audio signal while being videotaped. The videotaped performance, without any audio information, is superimposed on a suitable background image. A final product is formed by yet another device, for example, an audio/video mixer, which combines the composite video image with the previously obtained composite audio recording.

Such systems have several disadvantages. For example, the multi-step process for producing a customized recording is time-consuming. Because it is so lengthy, there is no immediate gratification to the performer, who must go through the many steps described above to obtain the customized recording. The process is expensive, since it monopolizes so much trained personnel time as well as specialized equipment.

Because of the complex equipment, the system is generally large and expensive, and must be provided in a studio-like atmosphere. Such systems are therefore constructed in a more-or-less permanent location such as an audio-video production studio. Thus, performers desiring customized video recordings must come to the studio rather than the studio going to the customers. Because of the sterile studio atmosphere, there is no mass appeal. Such a system is viewed by the general public as useful only for professional performers, rather than useful for anybody.

Finally, the quality depends too much on the training and experience of the operators. Further, because of the complex and multi-step procedure that must be followed, the quality also depends on the training and experience of the performer, who must first create an audio rendition and then recreate the rendition while lipsyncing to the original performance. With untrained personnel or untrained performers, the quality of the resulting video recording is significantly degraded.

SUMMARY OF THE INVENTION

It is therefore an object of the present invention to overcome these and other difficulties found in conventional methods and apparatuses for forming customized video recordings.

It is a further object of the present invention to provide a single construction which provides customized recordings in an informal atmosphere.

It is a further object of the present invention to provide a construction which provides customized video recordings immediately after a single live performance.

It is a further object of the present invention to provide a construction which combines audio and video signals from a single live performance with prerecorded audio and video background signals to produce a customized video recording.

It is a further object of the present invention to provide such a construction in a portable package that may be easily broken down into units and be reassembled at any site to provide customized video recording capability.

It is a further object of the present invention to provide such a portable construction in a form that encourages interaction not only with the performer but also with an audience. For example, the electronics may be arranged in an attractive tower which, when coupled with a portable performing stage, will create an open atmosphere that draws onlookers and encourages broad audience participation.

In one aspect of the invention, there is provided a recording apparatus having a prompter for displaying prompts, first audio means for providing first audio signals from among a prerecorded library, the first audio signals representing audio background synchronous with the prompts, first video means for providing first video signals from among a prerecorded library, the first video signals representing video backgrounds, second audio means for obtaining second audio signals representing a performance based on the displayed prompts, second video means for obtaining second video signals representing the performance, and combining means for combining the first and second audio signals and the first and second video signals to provide a customized video recording. If desired, such a recording apparatus may include, in any combination, means for modifying the audio or video portion through special effects or the like, and means for providing real time feedback to the performer so that the performer can monitor his performance.

In another aspect, the invention provides a recording apparatus comprising audio-video reproduction equipment for displaying prompts and providing a first audio signal synchronously with prompts, audio-video recording equipment for recording a live performance based on the displayed prompts, means for providing a video background, and a mixer for combining the first audio signal with the audio-video information from the recording equipment and with the video background, thereby to form a customized video recording. If desired, such a recording apparatus may include a graphic equalizer for modifying the audio signals, a key control circuit for modifying the key (or tonal qualities) of the first audio signal, a special effects device for altering the composite video signal, and means for providing real time feedback to the performer so that the performer can monitor the performance.

The present invention also provides a method for the production of customized video recording. In one aspect, the method includes the steps of displaying prompts for a performer, providing a first audio signal from among the prerecorded library, the first audio signal representing audio background in synchronism with the prompts, obtaining a first video signal from among the prerecorded library, the first video signal representing video backgrounds, obtaining audio and video signals representing a live performance based on the displayed prompts, and combining the audio signals and the video signals to produce a customized video recording.

In another aspect, the method provides the steps of providing prompts that include synchronous audio information from a prerecorded library, providing background video information from a prerecorded library, obtaining audio and video signals representing a live performance in synchronism with the display of the prompt information, combining the audio signals and the video signals, altering the audio and video signals in accordance with desired effects, and recording the altered signals thereby to form a customized video recording.

This brief summary is provided so that the nature of the invention may be understood. However, a specific example of the invention is described in significantly more detail in the following Description of the Preferred Embodiment in conjunction with the accompanying drawings, both of which form a complete part of the specification.

BRIEF DESCRIPTION OF THE DRAWINGS

FIG. 2 is a perspective view of the FIGS. 1A-1D embodiment.

DESCRIPTION OF THE PREFERRED EMBODIMENT

Figure 1A:
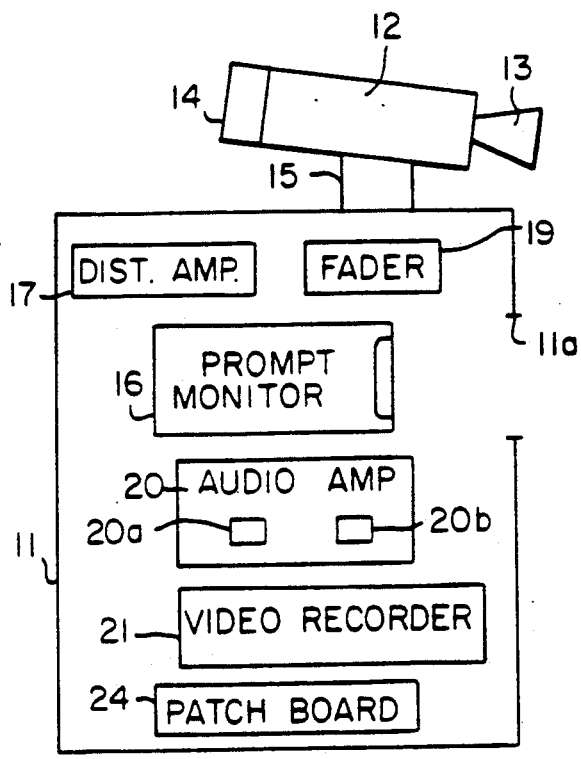
FIGS. 1A-1D are a schematic view of an embodiment of the invention showing an electronics tower A and B, an operator's console C, and a performing stage D.
Figure 1D:
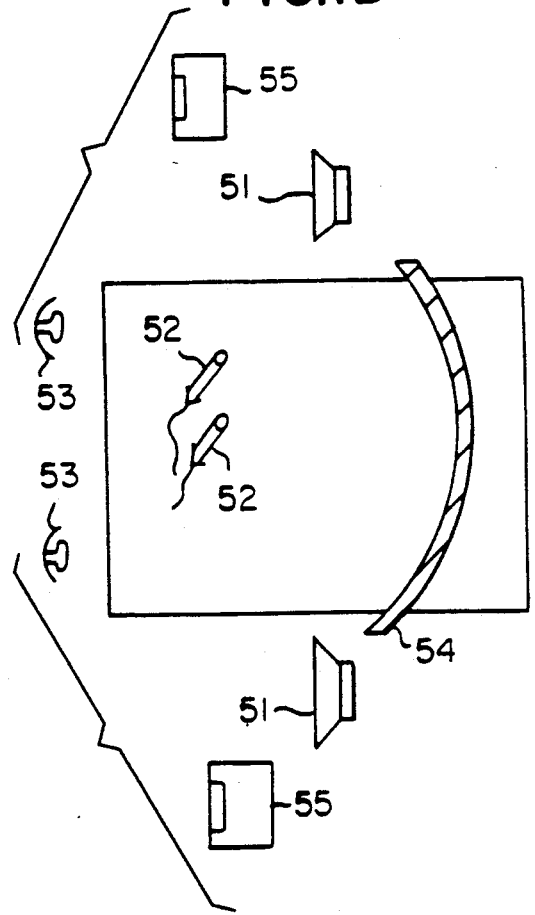
Figure 1B:
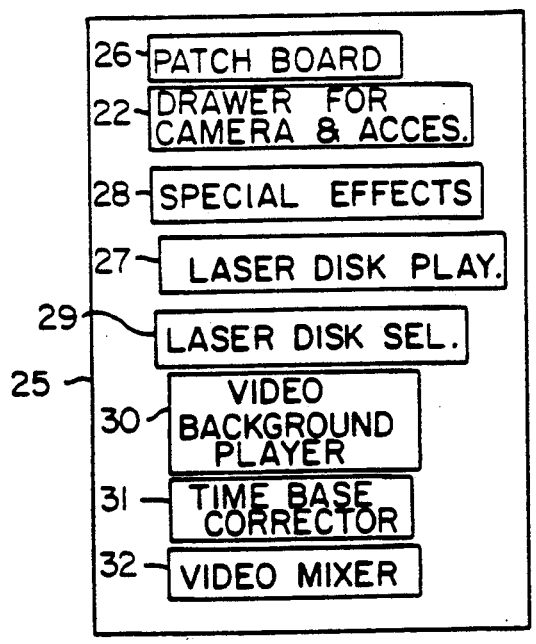
Figure 1C:
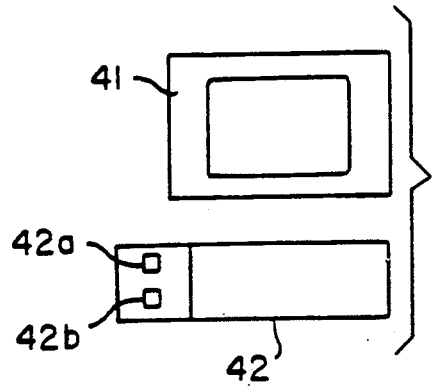

The invention will be explained with reference to a preferred embodiment which produces customized music videos as an example of customized video recordings. This, of course, should be understood as merely illustrative of the customized video recordings to which the invention is applicable, and not in any way limiting.

FIGS. 1A-1D shows this embodiment of the invention. As shown in FIGS. 1A-1D, the recording apparatus includes an electronics tower comprised of two modules A and B, an operator console C, and a performing stage D.

Upper module A includes a housing unit 11 for housing its associated electronics, the housing unit having openings 11a cut in the front and in the side (not shown) where appropriate, to allow access to the electronics and to allow visibility of prompt monitor 16. Mounted on the housing 11 are camera 12 and attached auto focus zoom lens 13. The camera provides foreground video information on a video out terminal, and is also fitted with an RGB adaptor 14 which provides separated red, green and blue signals representing foreground video information, as detected by the camera 12 through lens 13. The camera 12, lens 13 and RGB adaptor 14 are all mounted on a pan/tilt head 15 which allows the camera to be moved remotely.

Preferably, the camera serves as the genlock reference source for all video signals in the system, and the genlock signal for the system is derived from the foreground video information on the video out terminal of the camera.

Hereinafter, camera 12, lens 13 and RGB adaptor 14 will be referred to simply as the "video camera". Suitable units for each of these components are a PANASONIC WV-D5000 camera fitted with a WV-LZ14/8AF auto focus zoom lens and a WV-AD38 RGB adaptor.

A distribution amplifier 17, such as a VIDEOTEK VDA-16 video distribution amplifier, is mounted at the top of housing 11. The distribution amplifier 17 is used to provide a plurality of video signals for use at other points in the system, for example, in a number of performance monitors 55 situated around performance stage D. The distribution amplifier includes a video input terminal and a plurality of video output terminals.

Fader 19 is disposed adjacent the distribution amplifier 17. Fader 19 permits fade-in and fade-out of both audio and video signals in synchronization, and includes audio and video input terminals and audio and video output terminals. The VIDICRAFT Model SRT-100 audio mixer with audio/video fade may conveniently be used for fader 19.

A prompt monitor 16 is mounted in housing 11 under distribution amplifier 17 and fader 19. The prompt monitor, such as a PANASONIC BT-S1300N color video monitor, constitutes display means for displaying prompt information, in this case musical lyrics for a performer to sing. If desired, the prompt monitor may also be provided with an auxiliary video input to display a composite video image. Such a display is useful when a performer must interact with video background images.

An audio amplifier 20 is disposed beneath prompt monitor 16. The audio amplifier is provided with a key (or tone) control 20a and an equalizer 20b. The audio amplifier includes a stereo audio input terminal, dual microphone input terminals, stereo speaker output terminals, stereo audio output terminals, and video input and output terminals.

The audio amplifier 20 operates to accept a first audio signal selected from a prerecorded library of audio signals and to adjust the musical key of the first audio signal with key control 20a. The adjustment should be performed so as to match the key of the prerecorded audio information to the dynamic range of the performer's voice. Audio amplifier 20 also accepts microphone input representing the audio portion of the live performance of the performer. Equalizer 20b enhances the performer's voice by compensating for deficiencies in his voice and permits, for example, a boost in bass and/or treble. The audio amplifier 20 mixes the key-adjusted first audio signal with the compensated live audio performance to obtain a combined audio signal. The audio amplifier 20 may also provide for special audio effects (such as echo) further to enhance the performance by altering either audio signal (or their combination) in a desired way.

The audio amplifier also transmits video information from laser disc player 27 and laser disc selector 29 to prompt monitor 16. The prompt information comprises lyrics that are displayed on the prompt monitor to cue the performer. The lyrics are displayed synchronously with the first audio signal from the prerecorded library. A suitable device for audio amplifier 20 is the Terada Electric Works VDA-5000 Karaoke System Amplifier.

Beneath audio amplifier 20 is a recorder 21. The recorder 21 functions to receive processed audio and video information and to record it as the customized music video. Any standard videotape recorder, such as a PANASONIC VHS recorder, may be used for recorder 21. The video recorder includes stereo audio and video input terminals, a remote control terminal, and two video monitor output terminals.

A patch panel 24 is also located in housing 11. The patch panel operates to connect the electronics in module A with the electronics in module B.

The lower electronics module, module B, includes housing 25 that encloses the components with cutout portions that permit access to the components. Housing 25 contains a patch panel 26 for interfacing with patch panel 24. Beneath the patch panel 26 is a drawer 22 for receiving video camera 12 and other accessories during shipment.

Beneath drawer 22, lower housing 25 includes a video special effects generator 28. The special effects generator 28 accepts composite video signals from time base corrector 31 and permits the composite video signal to be altered through special effects, such as stop motion, stroboscopic multi-picture collages, mosaic, solarization, and zoom. Suitably, a SONY XV-D-300 digital video adaptor may be used as a special effects generator. The special effects generator 28 includes video input and output terminals.

Beneath special effects generator 28 is a unit that provides audio background information and prompt information. In this embodiment, a video disc player 27 and a video disc selector 29 are used to provide this information. The disc player and the selector are components of the aforementioned Karaoke system amplifier VDA-5000 and provide prompt information for display on prompt monitor 16 from a prerecorded library of video disc prompts. The video disk player 27 includes stereo audio and video output terminals. The video disk selector 29 permits selection of a particular track on the laser disk, and, in addition to control connections with video disk player 27 includes stereo audio and video input terminals and stereo audio and video output terminals.

Beneath the video disc player 27 and video disc selector 29 is a video background player 30. The video background player 30 functions to provide background information over which the performer's image is superimposed. The background information is selected from a prerecorded library of background video information. Preferably, a PANASONIC AG-6300 videocassette player is used as player 30. This device includes an advanced sync input. The advanced sync is used in connection with time base corrector 31, which corrects time base errors of playback video signals and synchronizes these video signals to the genlock signal. A suitable device for the time base corrector 31 is the HOTRONIC AE-61 digital video time base corrector. The time base corrector 31 includes video input and output terminals, genlocked video input and output terminals, and an advance sync terminal.

Beneath time base corrector 31 is video mixer 32. In this embodiment, an AMUSEMATTE video mixer 32, provided by ULTIMATTE video company, is used. The video mixer operates to combine foreground images and background images so as to combine two different video images. In the AMUSEMATTE video mixer, a fully additive mix is used, in which before the foreground image is added, a blue component (which represents the color of a monocolor backing sheet) is subtracted. In the present invention, the blue backing sheet is a blue screen 54 located in stage D before which the performer performs. Thus, the video mixer 32 functions to take an image only of a performer and superimpose it on a background image to obtain a composite video image.

The operator's console C includes an operator's monitor 41, such as a JVC TM-R9U 9-inch video monitor, upon which the operator may selectibly view one of two video inputs, the video portion of the customized video recording or the prompt information being displayed on prompt monitor 16. The operator's console C also includes a remote-control module 42 through which the operator controls pan/tilt head 15, the zoom for lens 13, and other controllable camera functions, such as white balance and auto/manual focus. A suitable camera remote controller is a PANASONIC WV-CR12 controller. Preferably, this controller is modified to provide a record/stop control 42a and a remote fade control 42b for use with fader 19.

Performance stage D includes speakers 51 for reproducing the composite audio signal (including both the audio background and the audio portion of the live performance) for the benefit of the audience. The performer is able to observe prompts on prompt monitor 16 while simultaneously hearing the combined audio soundtrack of his performance.

Directional microphones 52 are provided to generate an audio signal representing the audio portion of the performer's performance. Each microphone is directional so as to prevent feedback and to exclude background noise, including sounds generated from speakers 51.

A screen 54 is disposed behind the performer. The screen is colored blue in accordance with the color subtracted by the video mixer 32. A suitable frame for the screen is manufactured by Nomadic-Instand; appropriately colored velvet-looped VELCRO fabric is hung from the frame to form the screen.

Lights 53 are arranged around the stage to provide suitable illumination for the performance. High wattage track lighting has been found to give acceptably high temperature light.

If desired, performance monitors 55 may be disposed around the stage area. These performance monitors will display a composite audio and video rendition for the benefit of onlookers.

It will readily be appreciated that the organization of components shown in FIGS. 1A–1D permits the customized recording apparatus to be broken down into separate components A, B, C and D. These components may be formed into compact storage units and be shipped to any desired location. At the performance site, the components may be quickly reassembled through the use of patch panels 24 and 26 so as to provide portable, on-site capabilities for producing customized video recordings instantly.

FIG. 2 is a perspective view of a site installation of the above-described recording apparatus. As shown in FIG. 2, the electronics tower is arranged so that the video camera 12 and the prompt monitor 16 face the performing stage D. The remaining electronics are arranged so that they face operator's console C.

A decorative shield 61 is arranged around the electronics tower. The shield has cut-out portions 62 that allow access to the electronics, and a cut-out portion 64 which allows the video camera 12 to observe the performance. Preferably, the front surface 65 of decorative shield 61 is made of a smoked plexiglass material. The smoked plexiglass material allows the performer easily to observe prompt monitor 16 without being distracted by housings 11 and 25 which lie behind the decorative shield 61. Additionally, the semi-reflective base of smoked plexiglass is useful for the performer to gauge his performance. While it is possible for the performer to gauge his performance using performance monitors 55, it has been found that the use of the semi-reflective surface of smoked plexiglass is preferable since the performer is not distracted by the background image over which his image has been superimposed.

Figure 3A:
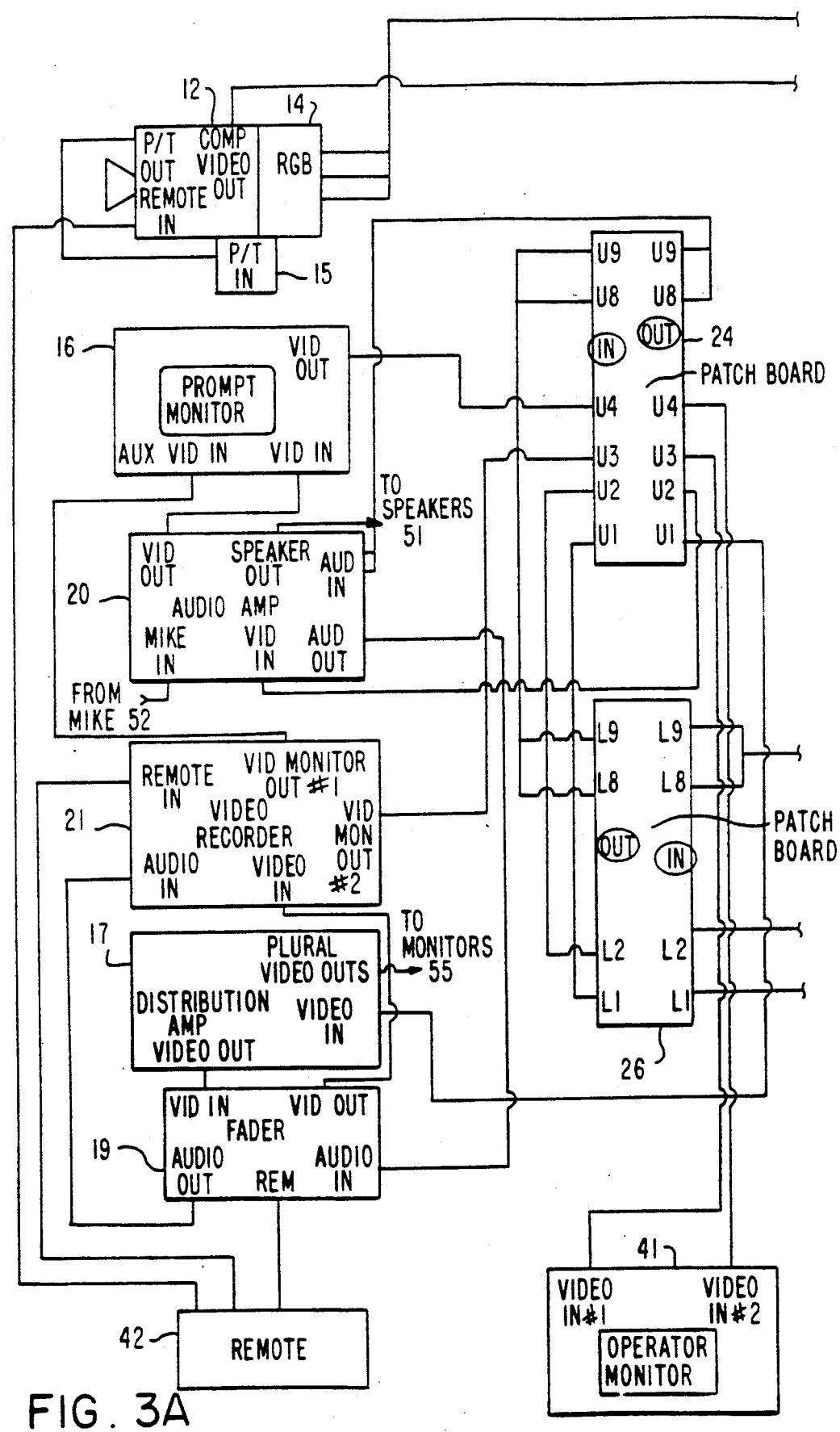
FIGS. 3, 3A and 3B are wiring diagrams showing the interconnections among the electronics.
Figures 3, 3B:
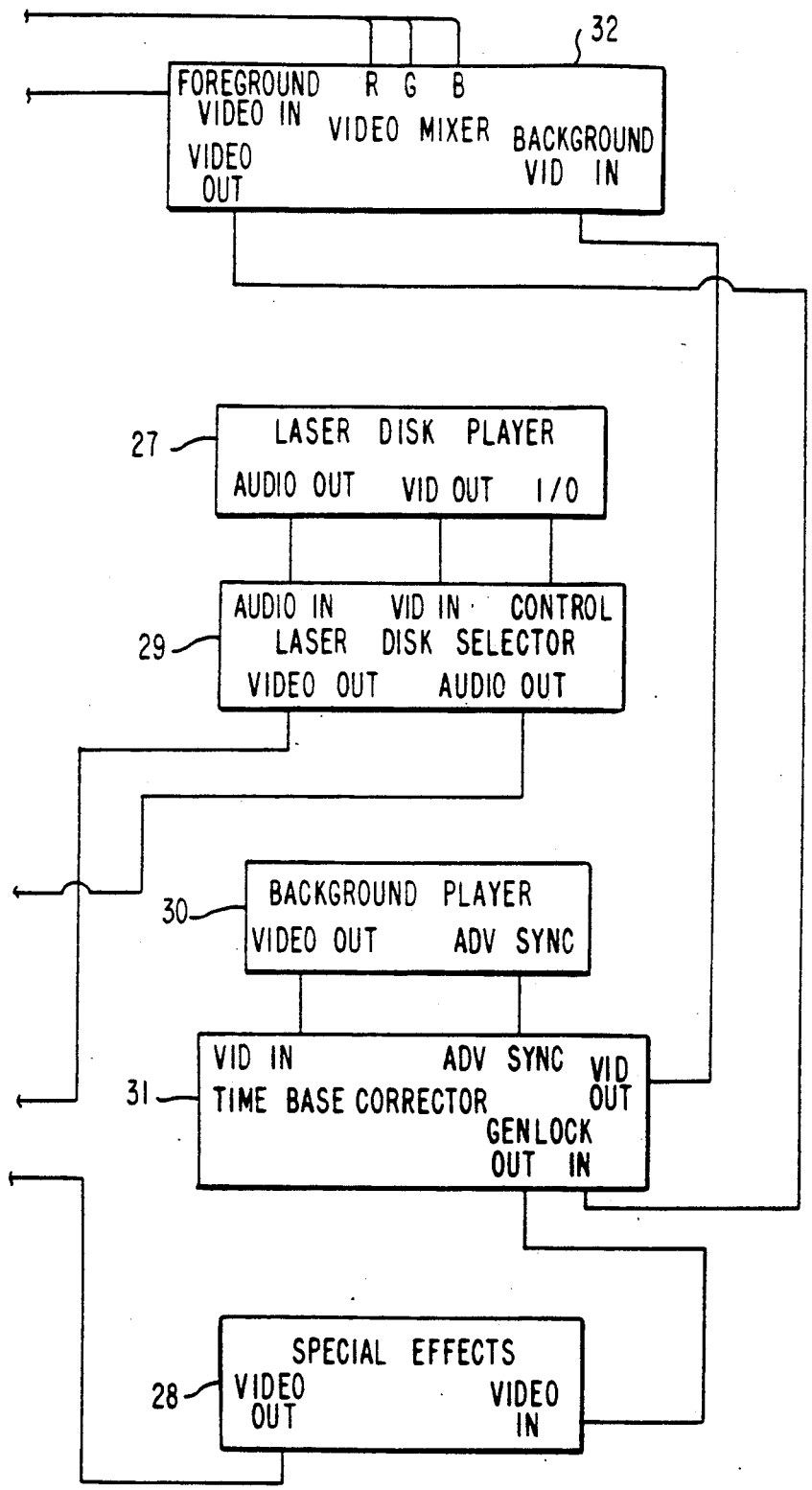

FIGS. 3, 3A, 3B are a schematic view of the connections between each of the electronic boxes shown in FIGS. 1A–1D. For clarity, power supply connections have been omitted. Connections among the electronics in lower module B will be described first.

As shown in FIGS. 3, 3A, 3B the remote input cable from pan/tilt head 15 should be connected to the pan/tilt output from video camera 12. The red, green and blue outputs of video camera 12 are connected to the red, green and blue inputs, respectively, of video mixer 32. 75 Ohm terminators are used in this connection. The foreground video information from the camera's video out terminal is connected to the foreground in terminal of video mixer 32.

The background video signal for video mixer 32 is provided indirectly from background video player 30. As shown in FIGS. 3, 3A, 3B, the video output from player 30 (representing background video information) is connected to the video input of time base corrector 31. Advance sync from the time base corrector 31 is connected to player 30. The video output from time base corrector 31 is fed to the background video input of video mixer 32.

After the video mixer 32 has superimposed the live performance onto the video background, the resulting video output is fed to the genlock input of time base corrector 31. The genlocked output video signal is fed to the video input of special effects generator 28. In accordance with operator control, special effects generator 28 alters the composite video signal and feeds the video output signal to the input of terminal L1 in patch board 26.

Video disc player 27 and video disc selector 29 should be interconnected so that these units operate in conjunction to permit a selected pre-recorded track to be displayed on prompt monitor 16 and to allow a pre-recorded audio track to be processed by audio amplifier 20. For the video signal, the video out of laser disc selector 29 should be connected to the input of terminal L2 in patch panel 26.

In the upper module A, the video input terminal of audio amplifier 20 should be connected to the output of terminal U2 in patch panel 24. The video output of audio amplifier 20 is connected to the video input of prompt monitor 21. The video output of recorder 21 is connected to the auxiliary video input of prompt monitor 16. These connections permit selective display of either prompt information (the normal mode) or composite video information on prompt monitor 16. As previously mentioned, composite video information may be used by sophisticated performers who desire to interact with the video background images.

The output of prompt monitor 16 is connected to the input of terminal U4 in patch panel 24.

As to audio wiring, the stereo output of video disc player 27 is connected to the stereo audio input of laser disc selector 29. The stereo audio output of video disc selector 29 is connected to the input of terminals L8 and L9 (for left and right channels) of patch panel 26. (In the drawings, stereo signals may be represented as single lines for clarity.)

The stereo audio input of audio amplifier 20 is connected to the output from terminals U8 and U9 from patch panel 24. The stereo audio output of audio amplifier 20 is connected to the stereo audio input of fader 19.

The stereo audio output from fader 19 is provided to the audio input of recorder 21.

The above connections are suitable for forming modules A and B into separate electronic components. When the recording apparatus is assembled at the recording site, the following additional connections are needed to interconnect module A and B and to connect the module to the external devices in operator console C and performing stage D.

The output of terminal L1 in patch panel 26 is connected to the input of terminal U1 in patch panel 24. The output of terminal L2 in patch panel 26 is connected to the input of terminal U2 in patch panel 24. The output of terminals L8 and L9 in patch panel 26 is connected to the input of terminals U8 and U9 in patch panel 24.

To connect the operator's console, input A of operator's monitor 41 is connected to the output of terminal U3 in patch panel 24. Input B of operator's monitor 41 is connected to the output of terminal U4 in patch panel 24. These connections allow the operator to choose between viewing the composite video of the performer against the background, or to view the prompt information being displayed to the performer on prompt monitor 16.

The camera output of the camera remote control 42 is connected to the camera remote input of video camera 12. If customized accessories form part of camera remote control 42, then these accessories should be connected from camera remote control 42 to recorder 21. The remote fader in camera remote control 42 should be connected to the fade control signal in fader 19.

To connect the stage D to the electronics tower, the following connections are needed.

The auxiliary video outputs from distribution amplifier 17 are connected to performance monitors 55. Microphones 52 are connected to the microphone input of audio amplifier 20. Speakers 51 are connected to the speaker outputs of audio amplifier 20.

With the foregoing structure in mind, the operation of the recording apparatus will now be described.

At the outset, the operator selects a video disk containing prompts from a library of prerecorded video disks. The video disk will include an audio track synchronous with the prompt. The audio track will include, as necessary, musical accompaniment as well as background singers. The video disk is inserted into video disk player 27.

The operator then selects a video tape containing a video background from a library of prerecorded backgrounds. The background library may, for example, include scenes of cities, psychedelic images, remote locations or mosaic patterns The selected background tape is placed into player 30. A short test may be run to ensure that the video background information is of desired color, hue, and level. If required, adjustments to time base corrector 31 are made at this time.

The operator next determines whether the quality of the performer's voice is such that it needs alteration or enhancement through equalizer 20$b$ in audio amplifier 20. If, for example, bass or treble performance needs to be accentuated, equalizer 20$b$ is adjusted accordingly.

Next, the operator selects an appropriate musical key for playing back the audio portion of the video disk in laser disk player 27. The operator may, for example, select a high key playback, if the performer is a woman, or a low key playback, if the performer is a man. The key is selected using key control 20A in audio amplifier 23.

The operator positions the video camera through remote control 42 to frame the performer properly. If required, lights 53 are adjusted and operation of the video mixer 32 is checked.

The video background player 30 is started and fader 19 is faded out using control 42b. Video recorder 21 is started (control 42a) and the desired track of audio background and prompt information from video disk player 27 is selected and started via video disk selector 29.

The performer is then cued (either by the operator or by a cue on the prompt monitor) and fader 19 is caused to fade in (control 42b).

At this point, the performer hears the audio track corresponding to the prompt information on the video disk over speakers 51. The performer sees himself reflected in the front 65 of decorative shield 61, sees the prompt information on prompt monitor 16 and begins to perform in accordance with the prompt information.

As the performance begins, the operator monitors audio and video signal levels and manipulates the video camera 12 through pan/tilt head 15 and zoom lens 13.

Video camera 12 obtains a video signal representing this live performance. Meanwhile, directional microphone 52 obtains an audio signal that excludes the background noise including the audio track being reproduced on speakers 51. Video mixer 32 subtracts the blue color of screen 54 from the video signal from the camera, and combines this foreground video information with the background video information being produced by player 30. Thus, two video signals are combined to produce a composite video signal.

The composite video signal is fed to time base corrector 31 where the genlock signal from camera 12 provides the genlock signal for all video signals in the system. The genlocked output signal is fed to the special effects generator 28 where the operator may introduce any of a variety of video special effects. The output of the special effects generator is fed to the distribution amplifier 17, fed to performance monitors 55 and also to fader 19.

Meanwhile, the audio track from the prompt information is fed from the laser disk player 26 and laser disk selector 29 to audio amplifier 20. Simultaneously, the audio portion of the live performance is converted to a second audio signal by microphone 52. This second audio signal is also fed to audio amplifier 20. The video track of the prompt information is adjusted for the proper key by key control 20A, and the second audio information from the live performance is adjusted for the voice qualities of the performer by equalizer 20B. These adjusted signals are combined in audio amplifier 20 and fed to fader 19.

Under control of the remote control 42, the fader 19 permits the combined audio information and the combined video information to be faded in and out, typically at the beginning and end of the performance. The output of fader 19 is fed to a recorder 21.

At the end of the performance, the operator fades fader 19 out (control 42b) and stops recorder 21. An instant, customized music video recording is thereby formed and given to the performer.

The embodiment of the invention described above is an embodiment specific to the production of customized music videos. Other embodiments are also possible to create other types of customized video recordings. For example, it will be evident to those skilled in the art that the invention may easily be adapted so as to provide customized video recording representing a stand-up comedy act. In such a case, the prompt information would consist of comedy material, while the audio track corresponding to the prompt information would consist of audience response (laughter and applause). The video background information reproduced from laser disk player 27 would be, for example, a nightclub scene. The effect of the apparatus would then be to combine a live comedy performance with background laughter and applause on an audio track and to combine a live comedy performance with a background of a nightclub scene on a video, thereby to produce a customized video recording of a stand-up comedy act.

Similarly, other modifications of the invention will be apparent to those skilled in the art, and the embodiments described above should not be considered as limiting, but only as illustrative. Instead, the scope of the invention should be determined by reference to the appended claims.

What is claimed is:

1. A recording apparatus comprising:
a prompter for displaying prompt information;
first audio means for providing an audio background signal from among a first prerecorded library of plural audio backgrounds, said audio background signal being synchronous with the prompt information;
first video means for obtaining a video background signal from among a second prerecorded library of plural video backgrounds, said video background signal being selectable independently of the audio background signal provided from the first prerecorded library;
second audio means for obtaining an audio signal representing a performance based on the displayed prompts;
second video means for obtaining a video signal representing the performance; and
combining means for combining the audio background signal and the audio signal and the video background signal and the video signal to produce composite audio and video signals.

2. A recording apparatus according to claim 1, further comprising means for modifying the tonal qualities of said audio signal or said audio background signal to accommodate the tonal quality of the performer.

3. A recording apparatus according to claim 1, further comprising means for altering any one of the audio background signal, the audio signal, the video background signal, and the video signal.

4. A recording apparatus according to claim 1, further comprising an enclosure that includes a reflective surface with which the performance can be monitored and through which the prompt information can be viewed.

5. A recording apparatus according to claim 1, wherein said apparatus is disposed in separable components, and further comprising means for connecting the separate components.

6. Apparatus according to claim 1, further comprising a monocolor screen against which the performer performs, wherein said first video means includes means for subtracting the color of the screen from the video background signal.

7. Recording apparatus according to claim 1, wherein the prompt information comprises musical lyrics.

8. Recording apparatus according to claim 1, further comprising an operator console for controlling said combining means.

9. Recording apparatus comprising:
audio/video reproduction equipment for displaying prompts and for providing an audio background signal representative of the prompts, said audio background signal from a first prerecorded library of plural audio backgrounds;
means for providing a video background signal from among a second prerecorded library of plural video backgrounds, the video background being selectable independently of the audio background signal from the first prerecorded library signal;
audiovisual recording equipment for obtaining an audio signal representative of a live performance based on the displayed prompts and for obtaining a video signal representative of the performance;
a mixer for combining the audio background signal and the audio signal and the video background signal and the video signal thereby to form a customized video recording.

10. Recording apparatus according to claim 9 further comprising an equalizer for modifying the tonal quality of the audio signal.

11. Apparatus according to claim 9 further comprising a key controller for modifying the key of the audio background signal.

12. Apparatus according to claim 9 further comprising a special effects generator for altering any one of the audio background signal, the audio signal, the video background signal, and the video signal.

13. Apparatus according to claim 9 wherein the recording apparatus is arranged in an electronics tower, and further comprising a surrounding enclosure, wherein a front surface of the surrounding enclosure comprises a semi-reflective surface through which the prompts are displayed.

14. Apparatus according to claim 9 wherein the apparatus is disposed in a plurality of separable components, and further comprising connecting means for connecting the plurality of components.

15. Apparatus according to claim 9 further comprising a mono-color screen against which the performer performs, wherein said audiovisual recording equipment includes means for subtracting the color.

16. Apparatus according to claim 9 wherein the prompts are musical lyrics.

17. Apparatus according to claim 9 comprising an operator console for controlling the mixer.

18. Method for making a customized video recording comprising the steps of:
displaying prompt information;
providing an audio background signal from among a first prerecorded library of plural audio backgrounds, the audio background signal being synchronous with the prompt information;
obtaining a video background signal from among a second prerecorded library of plural video backgrounds, the video background signal being selectable independently of the audio background signal from the first prerecorded library;
providing an audio signal representative of a performance based on the displayed prompts;
obtaining a video signal representing the performance; and
combining the audio background signal, the audio signal, the video background signal, and the video signal.

19. Method according to claim 18, further comprising the step of modifying the tonal quality of said audio background signal or said audio signal.

20. Method according to claim 18, further comprising the step of altering the video background signal or the video signal.

21. Method according to claim 18, further comprising the step of subtracting a predetermined color from the video signal.

22. A method for producing customized video recordings comprising the steps of:
providing prompts that include synchronous audio background information from among a first prerecorded library of plural prompt information;
providing video background information from among a second prerecorded library of video background information, said video background information being selectable independently of the audio background information from the first prerecorded library;
obtaining an audio signal and a video signal representative of a live performance synchronous with a display of the prompt information;
combining the audio and visual background information and the audio and video signals; and
recording the combined signals.

* * * * *

UNITED STATES PATENT AND TRADEMARK OFFICE
CERTIFICATE OF CORRECTION

PATENT NO. : 5,099,337
DATED : March 24, 1992
INVENTOR(S) : BRIAN L. CURY

Page 1 of 2

It is certified that error appears in the above-identified patent and that said Letters Patent is hereby corrected as shown below:

On title page, item,

[56] REFERENCES CITED

Foreign Patent Documents,
        "2508712   2/1975   Fed. Rep. of Germany" should read
        --2508712   9/1976   Fed. Rep. of Germany--.

COLUMN 2

Line 39, "real time" should read --real-time--.
    Line 56, "real" should read --real- --.

COLUMN 9

Line 49, "laser disk player 26" should read
        --laser disk player 27--.

COLUMN 10

Line 51, "audio signal or said audio background signal"
        should read --audio background signal or said
        audio signal--.

COLUMN 11

Line 22, "performance;" should read --performance; and--.

UNITED STATES PATENT AND TRADEMARK OFFICE
CERTIFICATE OF CORRECTION

PATENT NO. : 5,099,337
DATED : March 24, 1992
INVENTOR(S) : BRIAN L. CURY

Page 2 of 2

It is certified that error appears in the above-identified patent and that said Letters Patent is hereby corrected as shown below:

COLUMN 12

Line 47, "visual" should read --video--.

Signed and Sealed this

Thirteenth Day of July, 1993

Attest:

MICHAEL K. KIRK

Attesting Officer

Acting Commissioner of Patents and Trademarks